(12) United States Patent
Oishi et al.

(10) Patent No.: US 12,497,490 B2
(45) Date of Patent: Dec. 16, 2025

(54) MILLABLE SILICONE RUBBER COMPOSITION, SILICONE RUBBER CURED PRODUCT, AND ELECTRICALLY-INSULATING MEMBER FOR POWER CABLE CONNECTION

(71) Applicant: SHIN-ETSU CHEMICAL CO., LTD., Tokyo (JP)

(72) Inventors: Kazuhiro Oishi, Annaka (JP); Yoshiaki Koike, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 974 days.

(21) Appl. No.: 17/636,544

(22) PCT Filed: Aug. 5, 2020

(86) PCT No.: PCT/JP2020/029996
§ 371 (c)(1),
(2) Date: Feb. 18, 2022

(87) PCT Pub. No.: WO2021/033545
PCT Pub. Date: Feb. 25, 2021

(65) Prior Publication Data
US 2022/0298306 A1    Sep. 22, 2022

(30) Foreign Application Priority Data
Aug. 21, 2019 (JP) ................... 2019-151100

(51) Int. Cl.
| C08G 77/20 | (2006.01) |
| C08K 3/04 | (2006.01) |
| C08K 3/08 | (2006.01) |
| C08K 3/36 | (2006.01) |
| C08K 5/3472 | (2006.01) |
| H01B 3/46 | (2006.01) |

(52) U.S. Cl.
CPC ............ *C08G 77/20* (2013.01); *C08K 3/04* (2013.01); *C08K 3/08* (2013.01); *C08K 3/36* (2013.01); *C08K 5/3472* (2013.01); *H01B 3/46* (2013.01); *C08K 2201/006* (2013.01)

(58) Field of Classification Search
CPC . C08G 77/20; C08K 3/04; C08K 3/08; C08K 3/36; C08K 5/3472; C08K 2201/006; H01B 3/46
See application file for complete search history.

(56) References Cited

U.S. PATENT DOCUMENTS

| 4,678,827 A | 7/1987 | Itoh et al. |
| 2001/0014714 A1 | 8/2001 | Amarasekera et al. |
| 2003/0232202 A1 | 12/2003 | Yaginuma et al. |
| 2007/0213455 A1 | 9/2007 | Amarasekera et al. |
| 2013/0225735 A1 | 8/2013 | Matsukura et al. |
| 2016/0319079 A1* | 11/2016 | Koellnberger ......... C08G 77/38 |
| 2017/0372815 A1 | 12/2017 | Grau et al. |
| 2019/0119495 A1 | 4/2019 | Hara et al. |
| 2020/0165455 A1 | 5/2020 | Ashida et al. |
| 2020/0407559 A1 | 12/2020 | Oishi |

FOREIGN PATENT DOCUMENTS

| EP | 2 495 285 A1 | 9/2012 |
| JP | 61-228062 A | 10/1986 |
| JP | 9-284977 A | 10/1997 |
| JP | 11-246767 A | 9/1999 |
| JP | 2001-226591 A | 8/2001 |
| JP | 2004-18701 A | 1/2004 |
| JP | 2006-182911 A | 7/2006 |
| JP | 2011-116955 A | 6/2011 |
| JP | 2012-92305 A | 5/2012 |
| JP | 2015-46380 A | 3/2015 |
| JP | 2018-502963 A | 2/2018 |
| JP | 2019-77735 A | 5/2019 |
| WO | WO 2019/031245 A1 | 2/2019 |
| WO | WO 2019/077811 A1 | 4/2019 |

OTHER PUBLICATIONS

International Search Report (PCT/ISA/210) issued in PCT/JP2020/029996, dated Oct. 27, 2020.
Written Opinion of the International Searching Authority (PCT/ISA/237) issued in PCT/JP2020/029996, dated Oct. 27, 2020.

* cited by examiner

*Primary Examiner* — Shane Fang
(74) *Attorney, Agent, or Firm* — Birch, Stewart, Kolasch & Birch, LLP

(57) ABSTRACT

This millable silicone rubber composition provides a silicone rubber cured product having an appropriate hardness and elongation, does not contain an organosilicon compound having a nitrogen-containing organic group and an unsaturated hydrocarbon group, and contains:

(A) (A-1) 60-99 parts by mass of an organopolysiloxane raw rubber in which the proportion of an alkenyl group with respect to all substituents bonded to Si atoms is 0.001-2 mol %, and (A-2) an organopolysiloxane raw rubber in which the proportion of an alkenyl group with respect to all substituents bonded to Si atoms is more than 2 mol % but not more than 20 mol %, in an amount that accounts for 100 parts by mass together with the amount of the component (A-1);

(B) a reinforcing fumed silica having a BET surface area of not less than 50 $m^2/g$;

(C) a carbon black having a BET surface area of 50-150 $m^2/g$, (D) platinum or a platinum compound;

(E) benzotriazole;

(F) an aromatic hydrocarbon group-containing organopolysiloxane not containing an alkenyl group; and (G) a curing agent.

13 Claims, No Drawings

MILLABLE SILICONE RUBBER COMPOSITION, SILICONE RUBBER CURED PRODUCT, AND ELECTRICALLY-INSULATING MEMBER FOR POWER CABLE CONNECTION

TECHNICAL FIELD

This invention relates to a millable silicone rubber composition used to form an electrically insulating layer in intermediate connections or terminal connections of power cables, a silicone rubber cured product, and an electrically insulating member for use in power cable connections.

BACKGROUND ART

Electrically insulating sheath members, especially electrically insulating enclosures, used in power cable connections such as intermediate connections between power cables and terminations between power cable terminals and terminal fittings are often made of elastic rubbers having good electrical insulation such as silicone rubbers and ethylene-propylene (EP) rubbers.

Intermediate connections where electrically insulating elastic rubber is used and terminal connections having electric cable terminals and terminal fittings connected thereto encounter the problem of intermixing of an air layer that can cause dielectric breakdown during their application, depending on the power cable connecting method, and manual working problems such as variations of performance due to a difference among individual workers and time-consuming insertion.

The room temperature shrinkage method is recently employed. A core dilator is previously inserted inside an insulating enclosure to keep the enclosure in the dilated state, the core dilator with the dilated enclosure fitted thereon is moved to a connection between power cables, and the core dilator is then drawn out whereupon the enclosure shrinks and fits in place to form a joint structure. This method is preferred for operation efficiency and reduced variations due to a difference among individual workers.

The rubber material of which the enclosures of room temperature shrinkage type are made must have not only electrical properties, but also rubber strength because the enclosures must be readily dilatable and quickly restorable after removal of the core dilator. Specifically, a rubber material having moderate rubber hardness, high elongation at break, and low tensile set (or permanent set) is required from the aspects of working efficiency and reliability.

A comparison is made between silicone rubber and EP rubber. Since the silicone rubber has a better restoring ability on account of a lower tensile set than the EP rubber, the silicone rubber is characterized in that after removal of the core dilator, a better seal and adhesion to the cable or the like are established. Since the silicone rubber can be formulated into a higher elongation material, the silicone rubber is also characterized by ease of dilatation. Since the silicone rubber has enough water repellency to allow rain water to flow down, the silicone rubber is further characterized by resistance to salt damage caused by the deposition of salt-containing rain water in the seashore area.

The silicone rubber, however, suffers from a problem that on outdoor use, it is degraded by tracking due to leakage current. Under severer ambient conditions, there is a likelihood of erosion on the insulating member surface and the enclosure has a short lifetime. To obtain silicone rubber having improved tracking resistance and satisfactory electrical insulation, the silicone rubber must be heavily loaded with aluminum hydroxide. The resulting rubber is degraded in mechanical strength, failing to meet the physical properties described above.

Patent Document 1 (JP-A S61-228062) describes a flame retardant silicone rubber composition comprising an organosilicon compound having a nitrogen-containing organic group and an unsaturated group and a platinum base compound. This composition has improved flame retardance, but lacks some properties like mechanical strength and is thus unsuitable for power cable connection.

Also, Patent Document 2 (JP-A H09-284977) describes an enclosure for power cable connection containing benzotriazole and a platinum compound. There are problems of essential inclusion of aluminum hydroxide and poor mechanical strength.

Patent Document 3 (JP-A 2004-018701) describes a tracking resistant silicone rubber composition comprising phenyl silicone. In order to maintain such properties as mechanical strength and improve tracking resistance so as to meet the tracking resistance standard (IEC Publ. 587), it is necessary to add both a filler such as inorganic filler and an organosilicon compound having a nitrogen-containing organic group and an unsaturated hydrocarbon group. This invites an increase of hardness, giving rise to the problem that the enclosure becomes hard.

Also, Patent Document 4 (JP-A 2012-092305) describes a liquid silicone rubber composition for high-voltage electrical insulating members comprising silica which is surface-treated with a vinyl-containing organosilicon compound. The vinyl-containing organosilicon compound is commonly used in the relevant field. The temperature of the tensile set test is low. Not all necessary mechanical properties are met.

Patent Document 5 (JP-A 2019-077735) describes that when a predetermined amount of an organopolysiloxane (specifically, silicone oil) having a specific content of aromatic hydrocarbon group is added, a cured product having excellent tracking resistance is obtained without aluminum hydroxide filler. However, it is necessary to add an organosilicon compound having a nitrogen-containing organic group and an unsaturated group. The cured product having the organosilicon compound added thereto has a hardness of 50 or higher, indicating a hardened enclosure. Since the amount of carbon black added is described nowhere, its addition effect remains unknown.

PRIOR ART DOCUMENTS

Patent Documents

Patent Document 1: JP-A S61-228062
Patent Document 2: JP-A H09-284977
Patent Document 3: JP-A 2004-018701
Patent Document 4: JP-A 2012-092305
Patent Document 5: JP-A 2019-077735

SUMMARY OF INVENTION

Technical Problem

An object of the invention, which has been made under the above-mentioned circumstances, is to provide a millable silicone rubber composition which cures into a silicone rubber cured product having a sufficient hardness and elongation to facilitate working such as dilatation, a silicone rubber cured product, and an electrical insulating member for use in power cable connections.

The rubber physical properties required herein include a Durometer A hardness of up to 50 (on Durometer A scale), an elongation at break of at least 650%, and a tensile set of up to 15% as measured according to JIS K 6249:2003, the tensile set test conditions including temperature 180° C., time 22 hours, and 100% constant elongation.

Solution to Problem

Making extensive investigations to attain the above object, the inventors have found that a composition comprising (A-1) an organopolysiloxane gum having an alkenyl group content of 0.001 mol % to 2 mol %, (A-2) an organopolysiloxane gum having an alkenyl group content of more than 2 mol % to 20 mol %, (B) reinforcing fumed silica, (C) carbon black, (D) platinum or a platinum compound, (E) a triazole or derivative thereof, (F) an organopolysiloxane containing an aromatic hydrocarbon group, but not an alkenyl group, and (G) a curing agent cures into a cured product which has the desired values of properties, ease of working like dilatation, and excellent tracking resistance and is capable of preventing the progress of erosion after its occurrence. The invention is predicated on this finding.

Accordingly, the invention provides a millable silicone rubber composition, a silicone rubber cured product, and an electrical insulating member, as defined below.

1.
A millable silicone rubber composition comprising
(A) 100 parts by weight of an organopolysiloxane gum consisting of
  (A-1) 60 to 99 parts by weight of an organopolysiloxane gum containing 0.001 mol % to 2 mol % of an alkenyl group based on overall silicon-bonded substituent groups and
  (A-2) an organopolysiloxane gum containing more than 2 mol % to 20 mol % of an alkenyl group based on overall silicon-bonded substituent groups, in an amount to sum to 100 parts by weight together with component (A-1),
(B) 5 to 50 parts by weight of reinforcing fumed silica having a specific surface area of at least 50 $m^2/g$ as measured by the BET adsorption method,
(C) 0.01 to 5 parts by weight of carbon black having a specific surface area of 50 to 150 $m^2/g$ as measured by the BET adsorption method,
(D) platinum or a platinum compound in an amount to provide 1 to 1,000 ppm of platinum atoms based on the total weight of the organopolysiloxane gum as component (A),
(E) 0.01 to 5 parts by weight of a triazole or derivative thereof,
(F) 0.01 to 5 parts by weight of an organopolysiloxane containing an aromatic hydrocarbon group, but not an alkenyl group, and
(G) a curing agent in an amount sufficient to cure the composition,
wherein the composition is free of an organosilicon compound having a nitrogen-containing organic group and an unsaturated hydrocarbon group, and cures into a silicone rubber cured product having a Durometer A hardness of up to 50 and an elongation at break of at least 650% as measured according to JIS K 6249:2003.

2.
The millable silicone rubber composition of 1 which cures into a silicone rubber cured product having a breakdown voltage (BDV) as measured according to JIS K 6249:2003, which is improved at least 10% over a cured product of a composition obtained by removing (C) carbon black from said composition.

3.
The millable silicone rubber composition of 1 or 2 wherein component (B) is hydrophobic fumed silica.

4.
The millable silicone rubber composition of any one of 1 to 3, for use in the manufacture of power cable connectors.

5.
A silicone rubber cured product obtained by curing the millable silicone rubber composition of any one of 1 to 4.

6.
The silicone rubber cured product of 5, having a tensile set of up to 15% under the test conditions that 100% constant elongation continues at 180° C. for 22 hours, a volume resistivity of at least 1 TΩ·m, and a breakdown voltage (BDV) of at least 20 kV/mm, as measured according to JIS K 6249:2003, and undergoing no conduction breakdown in the tracking resistance test under an applied voltage of 4.5 kV by Method 1 test according to the IEC Publ. 587 standard.

7.
An electrically insulating member for use in power cable intermediate connections or terminal connections, comprising the silicone rubber cured product of 5 or 6.

Advantageous Effects of Invention

According to the invention, there is obtained a silicone rubber cured product which has a sufficient hardness and elongation to facilitate working such as dilatation, a small tensile set, and satisfactory mechanical strengths such as tensile strength and tear strength, is capable of dispersing the leakage current accumulating on the silicone rubber surface, and possesses excellent tracking resistance. The cured product is useful as room temperature shrinkable rubber members for power cables and especially useful as electrically insulating members in intermediate connections or terminal connections for power cables.

DESCRIPTION OF EMBODIMENTS

Now the invention is described in detail.

It is noted that the specific surface area of carbon black and reinforcing fillers is a value measured by the BET adsorption method. The millable silicone rubber composition generally refers to a silicone rubber composition which lacks spontaneous fluidity and has a high viscosity and non-liquidness at room temperature (25° C.) and which can be uniformly kneaded under shearing stresses on a kneader such as a roll mill (e.g., two-roll mill or three-roll mill). The organopolysiloxane gum generally refers to an organopolysiloxane which has a high degree of polymerization of 100 to 100,000 (i.e., high viscosity), and which lacks spontaneous fluidity and has non-liquidness at room temperature (25° C.). The numerical range of "A to B" is inclusive of the endpoints, that is, all values from A to B.

As used herein, the alkenyl group content indicates the value computed from the integration ratio as measured by $^1$H-NMR spectroscopy described below.

Measurement Conditions

Measurement frequency: 400 MHz
Measurement sample: a 25 wt % deuterochloroform solution of an organopolysiloxane compound of interest in deuterochloroform in a concentration of 25 wt %
Internal standard: chloroform The average degree of polymerization (DOP) of organopolysiloxane gums as components (A-1) and (A-2) refers to a weight average DOP as measured versus polystyrene standards by gel permeation chromatography (GPC) under the following conditions.

Measurement Conditions

Developing solvent: toluene
Flow rate: 1 mL/min
Detector: differential refractive index detector (RI)
Column: KF-805L×2 (Shodex)
Column temperature: 25° C.
Sample dose: 30 μL (toluene solution of 0.2 wt % concentration)

The invention provides a millable silicone rubber composition essentially comprising the following components (A) to (G), which cures into a silicone rubber cured product having a Durometer A hardness of up to 50 and an elongation at break of at least 650% as measured according to JIS K 6249:2003.

(A) Organopolysiloxane Gum

Component (A) is an organopolysiloxane gum which serves as a main component or base polymer in the inventive composition and consists of the following components (A-1) and (A-2) having different alkenyl group contents.

(A-1) an organopolysiloxane gum containing 0.001 mol % to 2 mol % of an alkenyl group based on overall silicon-bonded substituent groups (A-2) an organopolysiloxane gum containing more than 2 mol % to 20 mol % of an alkenyl group based on overall silicon-bonded substituent groups Components (A-1) and (A-2) are preferably represented by the compositional formula (1):

$$R_a SiO_{(4-a)/2} \qquad (1)$$

wherein R is each independently a $C_1$-$C_{12}$ unsubstituted or substituted monovalent hydrocarbon group, at least one R being an alkenyl group, and "a" is a positive number of 1.95 to 2.04.

The organopolysiloxane gum as component (A-1) is characterized by an alkenyl group content of 0.001 mol % to 2 mol %, preferably 0.001 mol % to 1 mol % based on the total moles of overall silicon-bonded substituent groups, that is, the total moles of R in formula (1). Examples of the alkenyl group include vinyl, allyl, butenyl and hexenyl, with vinyl being preferred. The alkenyl group may be located at an end or side chain of the molecular chain or both.

In formula (1), examples of the monovalent hydrocarbon group R other than alkenyl include $C_1$-$C_{12}$, preferably $C_1$-$C_8$ unsubstituted or substituted monovalent hydrocarbon groups, for example, alkyl groups such as methyl, ethyl, propyl and butyl, and cycloalkyl groups such as cyclohexyl, and aromatic hydrocarbon groups, for example, aryl groups such as phenyl and tolyl, and aralkyl groups such as β-phenylpropyl. In these groups, some or all of the carbon-bonded hydrogen atoms may be substituted by halogen atoms, and 3,3,3-trifluoropropyl is exemplary. Of the foregoing groups, methyl, phenyl and trifluoropropyl are preferred, with methyl being most preferred. In component (A-1), to methyl accounts for preferably at least 50 mol %, more preferably at least 80 mol %, even more preferably at least 90 mol % of R other than alkenyl.

In formula (1), "a" is a positive number of 1.95 to 2.04, preferably 1.97 to 2.02. The organopolysiloxane is preferably blocked at a molecular chain end with a triorganosilyl group, for example, trimethylsilyl, dimethylvinylsilyl or trivinylsilyl, more preferably blocked with an alkenyl-containing silyl group.

The organopolysiloxane gum as component (A-2) is characterized by an alkenyl group content of more than 2 mol % to 20 mol %, preferably 3 mol % to 15 mol % based on the total moles of overall silicon-bonded substituent groups, that is, the total moles of R in formula (1). Like component (A-1), examples of the alkenyl group include vinyl, allyl, butenyl and hexenyl, with vinyl being preferred. The alkenyl group may be located at an end or side chain of the molecular chain or both.

In formula (1), examples of the hydrocarbon group R other than alkenyl include $C_1$-$C_{12}$, preferably $C_1$-$C_8$ unsubstituted or substituted monovalent hydrocarbon groups. Examples thereof are as described for component (A-1). Inter alia, methyl, phenyl and trifluoropropyl are preferred, with methyl being most preferred. In component (A-2), methyl accounts for preferably at least 50 mol %, more preferably at least 80 mol %, even more preferably at least 90 mol % of R other than alkenyl.

In formula (1), "a" is a positive number of 1.95 to 2.04, preferably 1.97 to 2.02. The organopolysiloxane is preferably blocked at a molecular chain end with a triorganosilyl group, for example, trimethylsilyl, dimethylvinylsilyl or trivinylsilyl, more preferably blocked with an alkenyl-containing silyl group.

The invention is characterized by a mixture of two organopolysiloxane gums having different alkenyl group contents, that is, (A-1) an organopolysiloxane gum having a low alkenyl group content and (A-2) an organopolysiloxane gum having a high alkenyl group content in a specific ratio. Specifically, relative to 60 to 99 parts by weight, preferably 90 to 99 parts by weight of the organopolysiloxane gum as component (A-1), the organopolysiloxane gum as component (A-2) is used in an amount to sum to 100 parts by weight together with component (A-1), which corresponds to 1 to 40 parts by weight, preferably 1 to 10 parts by weight. This range ensures that the composition is cured into a cured product having improved rubber physical properties such as tear strength.

These organopolysiloxane gums are generally obtained from co-hydrolytic condensation of one or more organohalogenosilanes, or ring-opening polymerization of a cyclic polysiloxane (trimer or tetramer of siloxane) in the presence of an alkaline or acidic catalyst. They are basically linear diorganopolysiloxanes although they may be partially branched. A mixture of two or more different molecular structures is acceptable.

The organopolysiloxane gums as components (A-1) and (A-2) preferably have an average DOP of at least 3,000, with its upper limit being preferably 100,000. An average DOP of 5,000 to 20,000 is more preferred. Within the range, components (A-1) and (A-2) are gum-like and advantageously used in the invention. If the average DOP is less than 3,000, the resulting silicone rubber composition fails to meet the millable rubber properties and is undesirably aggravated in roll mill kneading ability.

(B) Reinforcing Fumed Silica

Component (B) is reinforcing fumed silica which serves as a filler for endowing the millable silicone rubber composition with satisfactory mechanical properties and which possesses a number of silanol (SiOH) groups on the surface. The reinforcing fumed silica as component (B) should have a specific surface area of at least 50 m$^2$/g, preferably 100 to 400 m$^2$/g as measured by the BET method. If the specific surface area is less than 50 m$^2$/g, the reinforcing effect of component (B) may become insufficient.

The reinforcing fumed silica as component (B) may be used in neat state or if necessary, after surface treatment with any of organosilicon compounds, e.g., organopolysiloxanes, organopolysilazanes, chlorosilanes and alkoxysilanes. From the standpoint of uniform dispersion of fumed silica and carbon black as component (C), it is preferred to use the reinforcing fumed silica which has been surface-treated with an organosilicon compound. The uniform dispersion of carbon black allows the amount of carbon black to be reduced for thereby preventing the volume resistivity and breakdown voltage (BDV) from lowering. Component (B) may be used alone or in admixture.

Any commercial products may be used as component (B) or reinforcing fumed silica. There are fumed silica products which are surface untreated or surface treated to be hydrophobic (i.e., hydrophilic or hydrophobic), for example, Aesosil series (Nippon Aerosil Co., Ltd.) such as Aerosil 130, Aerosil 200, Aerosil 300, Aerosil R-812, Aerosil R-972, and Aerosil R-974, Cabosil MS-5 and MS-7 (Cabot Corp.), Reolosil QS-102, 103, MT-10, Reolosil DM-20S, and Reolosil DM-30S (Tokuyama Corp.). Inter alia, the fumed silica which has been surface treated to be hydrophobic is preferred.

The reinforcing fumed silica as component (B) is blended in an amount of 5 to 50 parts by weight, preferably 10 to 40 parts by weight, more preferably 15 to 35 parts by weight per 100 parts by weight of the organopolysiloxane as component (A). If the amount deviates from the range, the resulting silicone rubber composition has an increased hardness and an electrically insulating enclosure obtained from curing of the silicone rubber composition is reduced in dilatation ability. If the amount is less than the lower limit, the resulting silicone rubber composition has unsatisfactory mechanical properties such as tensile strength and tear strength.

When the reinforcing fumed silica as component (B) is compounded, a dispersant may be used if necessary. Examples of the dispersant for the reinforcing fumed silica include various alkoxysilanes, phenyl-containing alkoxysilanes and hydrolyzates thereof, diphenylsilane diol, carbon functional silanes, silanol-containing low molecular siloxanes, and both end silanol-blocked organopolysiloxanes. When used, the amount of the dispersant added is preferably 0.1 to 50 parts by weight, more preferably 1 to 20 parts by weight per 100 parts by weight of the organopolysiloxane as component (A). Within the range, it is avoided that the resulting compound is extremely reduced in plasticity and the efficiency of roll working is aggravated by the occurrence of roll cohesion on a kneading means such as roll mill.

(C) Carbon Black

Component (C) is carbon black which imparts antistatic properties for the purpose of dispersing electric charges in the silicone rubber cured product. It is effective for dispersing the leakage current accumulating on the silicone rubber surface for suppressing breakdown due to electric field concentration, for thereby improving dielectric breakdown strength and preventing the progress of material breakage after the occurrence of erosion caused by leakage current.

Examples of the carbon black as component (C) include furnace black and acetylene black. The carbon black as component (C) should have a specific surface area of 50 to 150 m$^2$/g, preferably 50 to 130 m$^2$/g as measured by the BET adsorption method. If the specific surface area is less than 50 m$^2$/g, a satisfactory antistatic effect is not obtained. If the specific surface area exceeds 150 m$^2$/g, the electric field concentrates on the silicone rubber surface so that the silicone rubber is electrically charged and erosion occurs by tracking.

Component (C) should preferably have a DBP oil absorption of 100 to 300 mL/100 g, more preferably 120 to 250 mL/100 g. The range of DBP oil absorption is effective for preventing the leakage current accumulating on the silicone rubber surface from concentrating, achieving an antistatic effect, and hence, preventing the progress of material breakage after the occurrence of erosion by tracking. As used herein, the DBP oil absorption is measured by the method prescribed in JIS K 6217-4: 2008.

The carbon black is not particularly limited in shape, i.e., may be granular or powdery as long as the specific surface area by the BET adsorption method is within the range. When a platinum group metal based catalyst is used as component (G) or curing agent (to be described later), carbon black which has been desulfurized for preventing cure inhibition may be used.

Any commercial products may be used as component (C) or carbon black as long as they have the above range of specific surface area as measured by the BET adsorption method. Examples include ENSACO 260G and ENSACO 250G (Imerys S.A.) and Denka Black (Denka Co., Ltd.). Component (C) may be used alone or in a suitable combination of two or more.

The silicone rubber composition to which (C) carbon black is added cures into a silicone rubber cured product having a breakdown voltage (BDV) as measured by the method of JIS K 6249:2003, which is improved at least 10% over a cured product of a composition obtained by removing (C) carbon black from the same composition.

The carbon black as component (C) is blended in an amount of 0.01 to 5 parts by weight, preferably 0.02 to 2.5 parts by weight, more preferably 0.05 to 2 parts by weight per 100 parts by weight of component (A). If the amount is less than 0.01 part by weight, the silicone rubber cured product in which electric charge is insufficiently dispersed is largely reduced in reliability in the tracking resistance test and fails to improve the breakdown voltage (BDV) by at least 10%. If the amount exceeds 5 parts by weight, the cured product becomes electroconductive, is substantially reduced in reliability as insulating material, and fails to improve the BDV by at least 10%.

(D) Platinum or Platinum Compound

Component (D) is platinum or a platinum compound which is blended for improving the flame retardance of a silicone rubber cured product. Component (D) provides higher tracking resistance when combined with component (C) mentioned above and components (E) and (G) to be described later.

Examples of platinum or platinum compound as component (D) include elemental platinum, microparticulate platinum adsorbed on carriers such as silica, alumina and silica gel, platinum composites, platinic chloride, chloroplatinic acid, complexes of chloroplatinic acid hexahydrate with olefins or divinyldimethylpolysiloxane, and alcohol solutions of chloroplatinic acid hexahydrate, as well as complexes of chloroplatinic acid hexahydrate with aldehyde compounds, ether compounds or olefins. The amount of platinum or platinum compound as component (D) compounded is in the range of 1 to 1,000 ppm, preferably 5 to 500 ppm of platinum atoms based on the total weight of organopolysiloxane as component (A).

(E) Triazole or Derivative

Component (E) is triazole or a derivative thereof, which is effective for further improving tracking resistance when combined with components (C) and (D) mentioned above and component (G) to be described later. Since component (E) does not affect the cured physical properties as long as it is added in an amount within the specific range, a cured product having satisfactory mechanical strength is obtained.

Examples of the triazole derivative include benzotriazole, 1-methylbenzotriazole, 5,6-dimethylbenzotriazole, 2-phenylbenzotriazole, 1-hydroxybenzotriazole, methyl 1-benzotriazolecarboxylate, and benzotriazole derivatives. The benzotriazoles which are solid at room temperature may be used in the form of solution such as alcohol solution or in the form of paste such as silicone oil paste or silicone gum paste for the purpose of improving their dispersion in the composition.

The triazole or derivative as component (E) is blended in an amount of 0.01 to 5 parts by weight, preferably 0.1 to 2 parts by weight per 100 parts by weight of the organopolysiloxane as component (A). An amount of less than 0.01 part by weight is ineffective whereas an amount in excess of 5 parts by weight is undesirable because its effect is no longer improved and cure inhibition can occur in the case of a curing system based on addition curing reaction.

(F) Organopolysiloxane Containing Aromatic Hydrocarbon Group, but not Alkenyl Group Component (F) is an organopolysiloxane containing an aromatic hydrocarbon group, but not an alkenyl group, preferably an organopolysiloxane (or silicone oil) containing an aromatic hydrocarbon group, but not an alkenyl group, represented by the general formula (2). It is effective for further improving the tracking resistance of the silicone rubber cured product.

[Chem. 1]

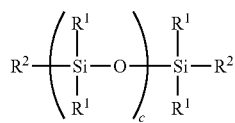

(2)

Herein, $R^1$ is each independently a $C_1$-$C_8$, preferably $C_1$-$C_6$ unsubstituted or substituted monovalent saturated hydrocarbon group, and phenyl accounts for at least 3 mol % of the total moles of $R^1$; $R^2$ is each independently a hydroxy group or a $C_1$-$C_8$, preferably $C_1$-$C_6$ unsubstituted or substituted monovalent saturated hydrocarbon group; and c is an integer of at least 3.

Examples of group $R^1$ include alkyl groups such as methyl, ethyl, propyl, butyl, hexyl and cyclohexyl, aryl groups such as phenyl and tolyl, aralkyl groups such as benzyl and 2-phenylethyl, and substituted forms of the foregoing in which some or all hydrogen atoms are substituted by halogen atoms or the like. Inter alia, methyl and phenyl are preferred. It is noted that phenyl accounts for at least 3 mol %, preferably 10 to 40 mol % of the total moles of $R^1$. As long as the phenyl content in $R^1$ is in the range, a tracking resistance improving effect is exerted without a loss of rubber strength.

$R^2$ is a hydroxy group or an unsubstituted or substituted monovalent saturated hydrocarbon group as exemplified above for $R^1$. Inter alia, methyl and hydroxy are preferred.

The subscript c is such an integer of at least 3 as to provide a viscosity at 25° C. of 50 to 1,000 mm²/s.

The aromatic hydrocarbon group-containing organopolysiloxane having formula (2) should preferably have a viscosity at 25° C. of 50 to 1,000 mm²/s, more preferably 100 to 500 mm²/s. If the viscosity is less than 50 mm²/s, the silicone rubber composition tends to have a low plasticity and poor workability. If the viscosity exceeds 1,000 mm²/s, the tracking resistance improving effect becomes weak, a large amount must be added, and there is a tendency of rubber strength lowering. It is noted that the viscosity (or kinematic viscosity) is measured at 25° C. by an Ostwald viscometer (the same holds true, hereinafter).

The aromatic hydrocarbon group-containing organopolysiloxane as component (F) is added in an amount of 0.01 to 5 parts by weight, preferably 0.1 to 2 parts by weight per 100 parts by weight of the organopolysiloxane as component (A). A too less amount fails to exert a satisfactory addition effect whereas an excessive amount may bleed out on the rubber surface, causing stains to the surface of a cured product.

(G) Curing Agent

In the millable silicone rubber composition for use in the manufacture of electrically insulating members, existing combinations of organohydrogenpolysiloxane and platinum base catalyst (addition reaction curing agents) or organic peroxide catalysts may be used as component (G) or curing agent.

In the embodiment wherein an organohydrogenpolysiloxane and a platinum base catalyst are used as the curing agent, the organohydrogenpolysiloxane preferably has the formula (3):

$$H_d R^3{}_e SiO_{(4-d-e)/2} \quad (3)$$

wherein $R^3$ is independently a $C_1$-$C_{15}$ substituted or unsubstituted monovalent hydrocarbon group, d and e are positive numbers satisfying $0<d\le3$, preferably $0.002\le d\le1.1$, more preferably $0.005\le d\le1$, $0\le e<3$, preferably $0.5\le e\le2.2$, more preferably $1.0\le e\le2.0$, and $0<d+e\le3$, preferably $1\le d+e\le3$, more preferably $1.002\le d+e\le2.7$.

The organohydrogenpolysiloxane may be linear, branched or cyclic as long as it has at least two hydrosilyl (SiH) groups in the molecule. Preferably the organohydrogenpolysiloxane has an average degree of polymerization of up to 300. Examples include diorganopolysiloxane endblocked with a dimethylhydrogensilyl group, copolymers of dimethylsiloxane, methylhydrogensiloxane and terminal trimethylsiloxy units, low viscosity fluids consisting essentially of dimethylhydrogensiloxane ($H(CH_3)_2SiO_{0.5}$) units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

Desirably the organohydrogenpolysiloxane as the curing agent is used in such amounts that a ratio (H/Vi) of the moles (H) of silicon-bonded hydrogen atoms (i.e., SiH groups) on organohydrogenpolysiloxane to the total moles (Vi) of alkenyl groups on organopolysiloxane (A) may range from 0.5 to 10, preferably from 1 to 5.

On the other hand, for the platinum base catalyst, the above-described component (D) can be a substitute. If necessary, a platinum compound is selected from elemental platinum alone, platinum composites, chloroplatinic acid, and complexes of chloroplatinic acid with alcohols, aldehydes, ethers and olefins, and preferably blended in such amounts as to give 2 to 2,000 ppm, especially 6 to 1,000 ppm of platinum atoms, as the total of the catalyst and component (D), based on the total weight of the organopolysiloxane as component (A).

An organic peroxide may be used as the curing agent. Examples of the organic peroxide include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, and t-butyl perbenzoate. The organic peroxide may be added in an amount of 0.1 to 5 parts by weight, preferably 0.2 to 4 parts by weight per 100 parts by weight of the organopolysiloxane as component (A).

The millable silicone rubber composition for use in the manufacture of electrically insulating members, as a whole, i.e., when overall components inclusive of component (A) are considered, should not contain an organosilicon compound having a nitrogen-containing organic group and an unsaturated hydrocarbon group. If this organosilicon compound is added, the cured product has an increased hardness and a low elongation at break, as demonstrated by the cured product having a hardness (Durometer A) in excess of 50 and an elongation at break of less than 650%. If this cured product is used in an enclosure as the power cable connecting member, the enclosure is hard and not readily dilatable. An extraneous force required for dilatation leads to a decline of productivity.

In the organosilicon compound having a nitrogen-containing organic group and an unsaturated hydrocarbon group, the nitrogen-containing organic group encompasses, for example, $C_1$-$C_5$, preferably $C_1$-$C_3$ aminoalkyl groups and imino groups, and the unsaturated hydrocarbon group encompasses, for example, $C_2$-$C_5$ alkenyl groups, preferably vinyl. The organosilicon compounds encompass organosilanes and organosiloxanes having such groups. The nitrogen-containing organic group or the unsaturated hydrocarbon group may bond to the same or different silicon atoms, while a group having a nitrogen-containing organic group and an unsaturated hydrocarbon group may bond to a silicon atom. Suitable groups other than the nitrogen-containing organic group and unsaturated hydrocarbon group include $C_1$-$C_{10}$ alkyl groups and $C_1$-$C_5$ alkoxy groups.

Examples of the organosilicon compound having a nitrogen-containing organic group and an unsaturated hydrocarbon group include organosilanes having the following formulae, and organosiloxanes resulting from hydrolysis thereof.

[Chem. 2]

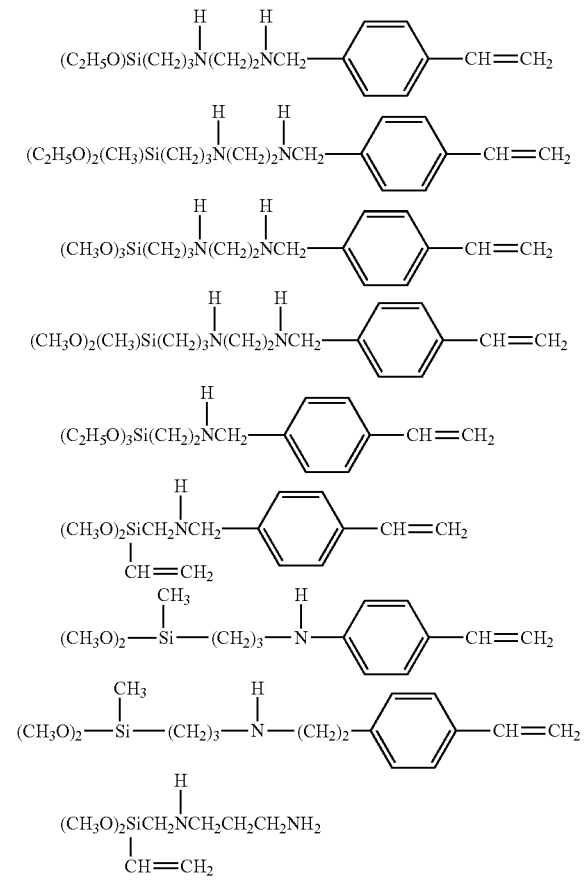

Also included in the organosilicon compound are siloxanes obtained from co-hydrolysis of a silane containing a nitrogen-containing organic group such as an aminoalkyl group (preferably $C_1$-$C_3$) or imino group and a silane containing an unsaturated hydrocarbon group such as an alkenyl group (preferably vinyl or propenyl), and siloxanes obtained from co-hydrolysis of a silane containing a nitrogen-containing organic group, a silane containing an unsaturated hydrocarbon group, and a silane not containing any of these groups. Examples of these siloxanes are shown below.

[Chem. 3]

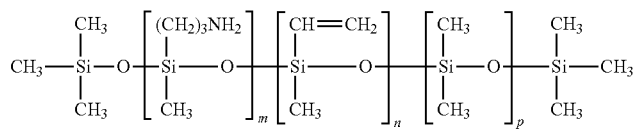

-continued

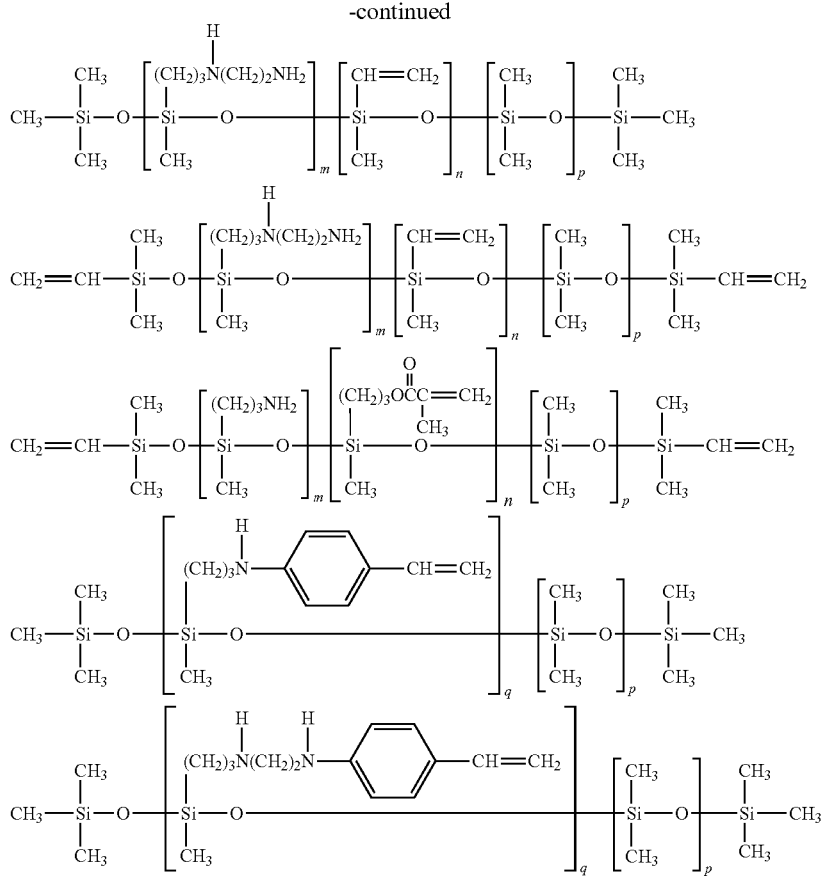

Herein m is an integer of at least 1, preferably 1 to 30, n is an integer of at least 1, preferably 1 to 50, p is an integer of at least 1, preferably 1 to 500, and q is an integer of at least 2, preferably 3 to 10.

Other Components

If desired, in addition to the aforementioned components, well-known fillers and additives which are incorporated in thermosetting silicone rubber compositions may be added to the millable silicone rubber composition insofar as they do not compromise the objects of the invention. Suitable additives include fillers such as quartz flour, diatomaceous earth, and calcium carbonate, colorants, tear strength improvers, heat resistance improvers such as titanium oxide and cerium oxide, flame retardants such as platinum compounds, acid acceptors, heat conduction improvers such as alumina and silicon nitride, and mold release agents. The other components may be used alone or in admixture.

Preparation Method

The millable silicone rubber composition of the invention is obtained by mixing the components in a well-known kneading machine such as a kneader, Banbury mixer or twin-roll mill. When the silicone rubber composition contains components (A) to (G), it is preferably prepared by mixing components (A) and (B) to form a premix, optionally heat treating the premix, mixing the premix with components (C), (D), (E), and (F), and adding component (G) to the mixture. When the composition containing components (A) to (G) further contains another component, it is preferably prepared by mixing components (A) and (B) to form a premix, mixing the premix with components (C), (D), (E), and (F), and the other component, and adding component (G) to the mixture.

Molding Method

In molding the millable silicone rubber composition of the invention, any of well-known molding methods may be selected in accordance with the shape and size of a desired molded product. Exemplary methods include cast molding, compression molding, injection molding, calendar molding, and extrusion molding.

Curing Method

In the above molding method, the curing conditions for the millable silicone rubber composition of the invention may be those conditions which are well known for a selected molding method. The composition may be cured at the same time as molding or (immediately) after molding typically at a temperature of 60 to 450° C., preferably 70 to 350° C., for about 10 seconds to about 1 day, preferably at a temperature of 80 to 300° C. for about 30 seconds to about half day.

Further, the composition may be post-cured (secondary cure) in an oven at 200° C. or higher, preferably 200 to 250° C. for at least 1 hour, preferably 1 to 70 hours, more preferably 1 to 10 hours for the purposes of reducing the tensile set and compression set of the cured product and removing low-molecular-weight siloxane residues in the silicone rubber.

Silicone Rubber Cured Product

The invention also provides a silicone rubber cured product which is obtained by curing the millable silicone rubber composition defined above. The cured product has physical properties as described below.

(1) Hardness (Durometer A)

The hardness as measured by Type A Durometer according to JIS K 6249:2003 should be up to 50, preferably up to 47, more preferably from 30 to 45. If the hardness exceeds 50, an extraneous force is necessary for dilatation of an enclosure, leading to a loss of productivity. If the cured product is too soft, the restoring force of an enclosure from the shrunk state is insufficient, failing to prevent intermixing of an air layer which can cause dielectric breakdown to power cables, and the adhesion to cables lowers, failing to meet the terminal properties for electric field relaxation.

(2) Elongation at Break

The elongation at break as measured according to JIS K 6249:2003 should be at least 650%, preferably at least 680%, more preferably at least 700%. If the elongation at break is less than 650%, an enclosure of room temperature shrinkage type can be broken upon dilatation. The upper limit of elongation at break is typically up to 1,500% though not critical.

(3) Tensile Set

The tensile set as measured according to JIS K 6249:2003 under the test conditions that 100% constant elongation continues at 180° C. for 22 hours is preferably up to 15%, more preferably up to 13%, most preferably up to 10%. If the tensile set exceeds 15%, the restoring force of an enclosure from the shrunk state is insufficient, failing to prevent intermixing of an air layer which can cause dielectric breakdown to power cables, and the adhesion to cables lowers, failing to meet the terminal properties for electric field relaxation.

(4) Volume Resistivity

The volume resistivity as measured according to JIS K 6249:2003 is preferably at least 1 TΩ·m, more preferably at least 5 TΩ·m, most preferably at least 10 TΩ·m. If the volume resistivity is less than 1 TΩ·m, insufficient insulation allows for concentration of an electric field at intermediate and terminal connections of high-voltage power cables, which can cause dielectric breakdown. The upper limit of volume resistivity is typically up to 1,000 TΩ·m (1 PΩ·m), though not critical.

(5) Breakdown Voltage (BDV)

The breakdown voltage (BDV) as measured according to JIS K 6249:2003 is preferably at least 20 kV/mm, more preferably at least 22 kV/mm, most preferably at least 25 kV/mm. If the BDV is less than 20 kV/mm, the cured product cannot withstand the concentration of an electric field at intermediate and terminal connections of high-voltage power cables, short-circuiting occurs to generate heat which can cause combustion or breakage. The upper limit of BDV is typically up to 40 kV/mm, though not critical.

(6) Tracking Resistance Test

A test specimen preferably undergoes no conduction breakdown in the tracking resistance test under an applied voltage of 4.5 kV described in the inclined plane tracking resistance test (Method 1) according to the IEC Publ. 587 standard. If conduction breakdown occurs, there is a likelihood that when an insulating member is used outdoor at intermediate and terminal connections of high-voltage power cables, the insulating member undergoes erosion at its surface and thus has a short lifetime as enclosure.

When the silicone rubber cured product meets all the above requirements, an enclosure made thereof allows for efficient working during dilatation and has sufficiently high mechanical strength and tracking resistance to maintain the intermediate and terminal connections of power cables stable over a long term.

On the other hand, if the silicone rubber cured product not meeting the above requirements is used as an electric field relaxation layer at intermediate and terminal connections of power cables according to the room temperature shrinkage method, electric stresses (lines of electric force) concentrate at the connection, a load is applied to the sheath cable insulator, and partial electric discharge occurs due to the increased charge amount. If this phenomenon occurs repeatedly, there is a possibility that the insulation resistance at that portion gradually decreases, and the cable is prematurely degraded, eventually leading to dielectric breakdown and short-circuiting of cables.

Since the cured product of the millable silicone rubber composition of the invention meets all the above physical requirements, it is advantageously used as an electrical insulating member at an intermediate or terminal connection of power cable, especially at an intermediate or terminal connection of high-voltage cable, for example, as a room temperature shrinkable rubber member.

EXAMPLES

Examples and Comparative Examples are given below for illustrating the invention, but the invention is not limited thereto.

Preparation Example 1

Compound A was prepared by kneading 95 parts by weight of (A-1) organopolysiloxane consisting of 99.975 mol % of dimethylsiloxane units and 0.025 mol % of dimethylvinylsiloxy units and having an average DOP of about 8,000 (percent of alkenyl groups based on overall silicon-bonded substituent groups: 0.0125 mol %), 5 parts by weight of (A-2) organopolysiloxane consisting of 89.993 mol % of dimethylsiloxane units, 9.982 mol % of methylvinylsiloxane units, and 0.025 mol % of di methylvinylsiloxane units and having an average DOP of about 8,000 (percent of alkenyl groups based on overall silicon-bonded substituent groups: 5.00 mol %), 25 parts by weight of (B) fumed silica having a specific surface area of 200 mm$^2$/g (Aerosil 200 by Nippon Aerosil Co., Ltd.), and 3 parts by weight of dimethylpolysiloxane containing silanol groups at both ends and having an average DOP of 13 and a viscosity at 25° C. of 15 mm$^2$/s as a dispersant on a kneader, and heat treating the mixture at 180° C. for 3 hours.

Preparation Example 2

Compound B was prepared by kneading 95 parts by weight of (A-1) organopolysiloxane consisting of 99.975 mol % of dimethylsiloxane units and 0.025 mol % of dimethylvinylsiloxy units and having an average DOP of about 8,000 (percent of alkenyl groups based on overall silicon-bonded substituent groups: 0.0125 mol %), 5 parts by weight of (A-2) organopolysiloxane consisting of 89.993 mol % of dimethylsiloxane units, 9.982 mol % of methylvinylsiloxane units, and 0.025 mol % of dimethylvinylsiloxane units and having an average DOP of about 8,000 (percent of alkenyl groups based on overall silicon-bonded substituent groups: 5.00 mol %), 25 parts by weight of (B) fumed silica having a specific surface area of 130 mm$^2$/g which is hydrophobized with dichlorodimethylsilane (Aerosil R-972 by Nippon Aerosil Co., Ltd.), and 3 parts by weight of dimethylpolysiloxane containing silanol groups at both ends and having an average DOP of 13 and a viscosity at 25° C. of 15 mm$^2$/s as a dispersant on a kneader, and heat treating the mixture at 180° C. for 3 hours.

Comparative Preparation Example 1

Compound C was prepared by kneading 95 parts by weight of (A-1) organopolysiloxane consisting of 99.975 mol % of dimethylsiloxane units and 0.025 mol % of dimethylvinylsiloxy units and having an average DOP of about 8,000 (percent of alkenyl groups based on overall silicon-bonded substituent groups: 0.0125 mol %), 5 parts by weight of (A-2) organopolysiloxane consisting of 89.993 mol % of dimethylsiloxane units, 9.982 mol % of methylvinylsiloxane units, and 0.025 mol % of dimethylvinylsiloxane units and having an average DOP of about 8,000 (percent of alkenyl groups based on overall silicon-bonded substituent groups: 5.00 mol %), 25 parts by weight of (B) fumed silica having a specific surface area of 200 mm²/g (Aerosil 200 by Nippon Aerosil Co., Ltd.), 5 parts by weight of hexamethyldisilazane as a dispersant, and 1 part by weight of water on a kneader, further kneading 1.0 part by weight of an organosilicon compound having a nitrogen-containing organic group and an unsaturated hydrocarbon group, represented by the following formula (4), and heat treating the mixture at 180° C. for 3 hours.

[Chem. 4]

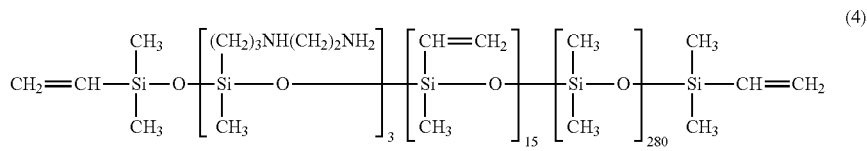

(4)

Example 1

On a twin-roll mill, 128 parts by weight of Compound A in Preparation Example 1 was compounded with 0.10 part by weight of (C) carbon black having a BET adsorption specific surface area of 70 m²/g and a DBP oil absorption of 190 mL/100 g (ENSACO 260G, Imerys), 0.13 part by weight of (D) a 2-ethylhexanol solution of chloroplatinic acid hexahydrate (platinum concentration 2 wt %), 6 parts by weight of titanium oxide, 0.6 part by weight of cerium oxide, 0.19 part by weight of (E) benzotriazole, and 1.2 parts by weight of (F) silicone oil having the following formula, containing 25 mol % of phenyl and 75 mol % of methyl based on the overall substituent groups, wherein phenyl accounts for 26 mol % of overall $R^1$ in formula (2), and having a viscosity of 400 mm²/s. Further, 0.8 part by weight of (G) 2,4-dicumyl peroxide as a curing agent was incorporated on the twin-roll mill, yielding a silicone rubber composition 1.

[Chem. 5]

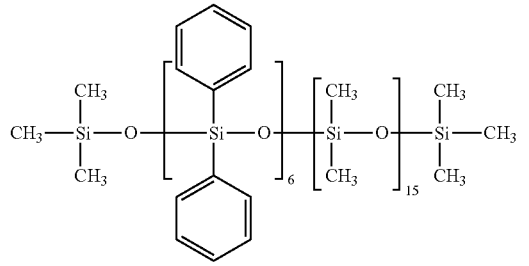

Example 2

On a twin-roll mill, 128 parts by weight of Compound B in Preparation Example 2 was compounded with 0.50 part by weight of (C) carbon black having a BET adsorption specific surface area of 69 m²/g and a DBP oil absorption of 160 mL/100 g (Denka Black, Denka Co., Ltd.), 0.13 part by weight of (D) a 2-ethylhexanol solution of chloroplatinic acid hexahydrate (platinum concentration 2 wt %), 6 parts by weight of titanium oxide, 0.6 part by weight of cerium oxide, 0.19 part by weight of (E) benzotriazole, and 1.2 parts by weight of (F) silicone oil having the following formula, containing 25 mol % of phenyl and 75 mol % of methyl based on the overall substituent groups, wherein phenyl accounts for 26 mol % of overall $R^1$ in formula (2), and having a viscosity of 400 mm²/s. Further, 0.8 part by weight of (G) 2,4-dicumyl peroxide as a curing agent was incorporated on the twin-roll mill, yielding a silicone rubber composition 2.

[Chem. 6]

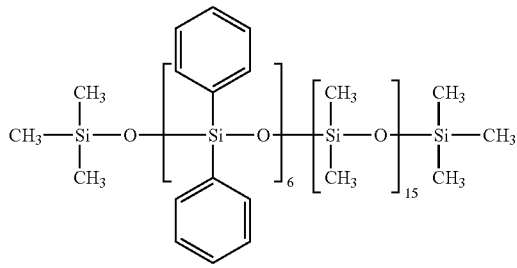

Comparative Example 1

On a twin-roll mill, 132 parts by weight of Compound C in Comparative Preparation Example 1 was compounded with 0.10 part by weight of (C) carbon black having a BET adsorption specific surface area of 70 m²/g and a DBP oil absorption of 190 mL/100 g (ENSACO 260G, Imerys), 0.13 part by weight of (D) a 2-ethylhexanol solution of chloroplatinic acid hexahydrate (platinum concentration 2 wt %), 7 parts by weight of titanium oxide, 0.7 part by weight of cerium oxide, 0.20 part by weight of (E) benzotriazole, and 1.3 parts by weight of (F) silicone oil having the following formula, containing 25 mol % of phenyl and 75 mol % of methyl based on the overall substituent groups, wherein phenyl accounts for 26 mol % of overall R¹ in formula (2), and having a viscosity of 400 mm²/s. Further, 0.8 part by weight of (G) 2,4-dicumyl peroxide as a curing agent was incorporated on the twin-roll mill, yielding a silicone rubber composition 3.

[Chem. 7]

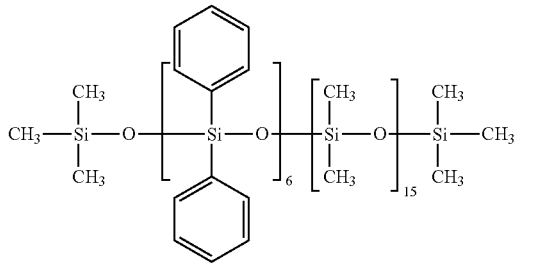

Comparative Example 2

On a twin-roll mill, 128 parts by weight of Compound A in Preparation Example 1 was compounded with 0.13 part by weight of (D) a 2-ethylhexanol solution of chloroplatinic acid hexahydrate (platinum concentration 2 wt %), 6 parts by weight of titanium oxide, 0.6 part by weight of cerium oxide, 0.19 part by weight of (E) benzotriazole, and 1.2 parts by weight of (F) silicone oil having the following formula, containing 25 mol % of phenyl and 75 mol % of methyl based on the overall substituent groups, wherein phenyl accounts for 26 mol % of overall R¹ in formula (2), and having a viscosity of 400 mm²/s. Further, 0.8 part by weight of (G) 2,4-dicumyl peroxide as a curing agent was incorporated on the twin-roll mill, yielding a silicone rubber composition 4.

[Chem. 8]

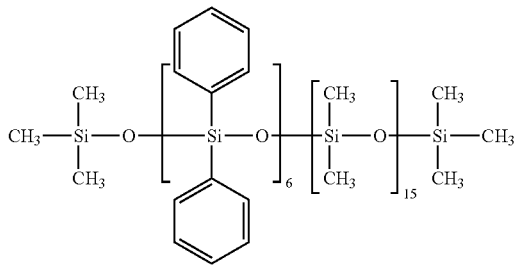

Comparative Example 3

On a twin-roll mill, 128 parts by weight of Compound B in Preparation Example 2 was compounded with 13 parts by weight of (C) carbon black having a BET adsorption specific surface area of 69 m²/g and a DBP oil absorption of 160 mL/100 g (Denka Black, Denka Co., Ltd.), 0.13 part by weight of (D) a 2-ethylhexanol solution of chloroplatinic acid hexahydrate (platinum concentration 2 wt %), 6 parts by weight of titanium oxide, 0.6 part by weight of cerium oxide, 0.19 part by weight of (E) benzotriazole, and 1.2 parts by weight of (F) silicone oil having the following formula, containing 25 mol % of phenyl and 75 mol % of methyl based on the overall substituent groups, wherein phenyl accounts for 26 mol % of overall R¹ in formula (2), and having a viscosity of 400 mm²/s. Further, 0.8 part by weight of (G) 2,4-dicumyl peroxide as a curing agent was incorporated on the twin-roll mill, yielding a silicone rubber composition 5.

[Chem. 9]

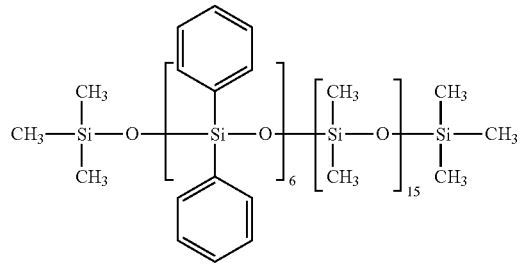

From the silicone rubber compositions (Compositions 1 to 5) obtained in Examples 1, 2 and Comparative Examples 1 to 3, test cured product sheets were prepared according to JIS K 6249:2003. The test sheets were measured for various rubber physical properties including hardness (Durometer A), tensile strength, elongation at break, tear strength, and tensile permanent set.

(Curing Conditions)

The composition was press cured under a molding pressure of 7.8 MPa (80 kgf/cm²) at 165° C. for 10 minutes and post-cured (secondary vulcanization) at 200° C. for 4 hours, yielding test cured product sheets of 10 mm squares and 6 mm, 2 mm or 1 mm thick.

Measurement of Volume Resistivity

A test rubber sheet of 1 mm thick was prepared under the same curing conditions as used for the measurement of rubber physical properties and measured for volume resistivity according to JIS K 6249:2003.

Measurement of Breakdown Voltage (BDV)

A test rubber sheet of 1 mm thick was prepared under the same curing conditions as used for the measurement of rubber physical properties and measured for breakdown voltage (BDV) at a voltage ramp rate of 2 kV/sec according to JIS K 6249:2003, using Trans Oil A (Showa Shell Sekiyu K.K.).

Tracking Resistance Test

Judgment was made by Method 1 test according to the IEC Publ. 587 standard. A rubber sheet specimen of 6 mm thick was prepared under the same curing conditions as used for the measurement of rubber physical properties. The test conditions: applied voltage 4.5 kV, frequency 50 Hz, and electrode span 50 mm were held for 6 hours while a contaminant solution (aqueous solution of 0.1 wt % $NH_4Cl$ and 0.02 wt % nonionic surfactant) was fed dropwise from the upper electrode to the specimen at a rate of 0.6 ml/min. The specimen in which the track developed to incur conduction breakdown is judged "Rejected" whereas the specimen devoid of conduction breakdown was judged "Passed." Breakdown time, erosion depth and weight loss were evaluated.

Table 1 shows physical values of the test items measured on the test rubber sheets of Examples 1, 2 and Comparative Examples 1 to 3.

TABLE 1

|  |  |  | Example | | Comparative Example | | |
|---|---|---|---|---|---|---|---|
|  |  |  | 1 | 2 | 1 | 2 | 3 |
| Composition (parts by weight) | (A) Organopolysiloxane gum | (A-1) Vi group 0.0125 mol % | 95 | 95 | 95 | 95 | 95 |
|  |  | (A-2) Vi group 5.00 mol % | 5 | 5 | 5 | 5 | 5 |
|  | (B) Reinforcing fumed silica | Aerosil 200 | 25 |  | 25 | 25 |  |
|  |  | Aerosil R-972 |  | 25 |  |  | 25 |
|  | (C) Carbon black | ENSACO 260G | 0.10 |  | 0.10 |  |  |
|  |  | Denka Black |  | 0.50 |  |  | 13 |
|  | (D) Platinum or platinum compound | 2-ethylhexanol solution of chloroplatinic acid hexahydrate (Pt 2 wt %) | 0.13 | 0.13 | 0.13 | 0.13 | 0.13 |
|  | (E) Triazole or derivative | Benzotriazole | 0.19 | 0.19 | 0.20 | 0.19 | 0.19 |
|  | (F) Aromatic hydrocarbon group-containing organopolysiloxane | Alkenyl-free silicone oil | 1.2 | 1.2 | 1.3 | 1.2 | 1.2 |
|  | (G) Curing agent | 2,4-dicumyl peroxide | 0.8 | 0.8 | 0.8 | 0.8 | 0.8 |
|  | Dispersant | Dual end silanol dimethylpolysiloxane | 3 | 3 |  | 3 | 3 |
|  |  | Hexamethyldisilazane |  |  | 5 |  |  |
|  |  | Water |  |  | 1 |  |  |
|  | Other components | Titanium oxide | 6 | 6 | 7 | 6 | 6 |
|  |  | Cerium oxide | 0.6 | 0.6 | 0.7 | 0.6 | 0.6 |
|  |  | Organopolysiloxane having nitrogen-containing organic group and vinyl group |  |  | 1 |  |  |
| Test results | Hardness (Durometer A) |  | 40 | 40 | 46 | 40 | 47 |
|  | Tensile strength (MPa) |  | 9.3 | 9.7 | 7.1 | 9.0 | 8.8 |
|  | Elongation at break (%) |  | 820 | 810 | 590 | 780 | 590 |
|  | Tear strength @crescent (kN/m) |  | 36 | 35 | 42 | 33 | 24 |
|  | Tensile set @180° C./22 hr/100% elongation (%) |  | 9 | 9 | 8 | 10 | 16 |
|  | Volume resistivity (TΩ · m) |  | 160 | 550 | 130 | 100 | 20 |
|  | BDV (kV/mm) |  | 26 | 27 | 25 | 23 | 7 |
|  | Tracking resistance test (test voltage 4.5 kV) | Judgement | Passed | Passed | Passed | Rejected | Rejected |
|  |  | Minimum breakdown time (min) | 360< | 360< | 360< | 220 | 5 |
|  |  | Maximum erosion depth (mm) | 4.3 | 3.3 | 4.7 | 5.8 | breakdown |
|  |  | Average weight loss (%) | 5.1 | 2.3 | 0.8 | 15.0 | breakdown |

The invention claimed is:

1. A millable silicone rubber composition comprising
(A) 100 parts by weight of an organopolysiloxane gum consisting of
(A-1) 60 to 99 parts by weight of an organopolysiloxane gum containing 0.001 mol % to 2 mol % of an alkenyl group based on overall silicon-bonded substituent groups and
(A-2) an organopolysiloxane gum containing more than 2 mol % to 20 mol % of an alkenyl group based on overall silicon-bonded substituent groups, in an amount to sum to 100 parts by weight together with component (A-1),
(B) 5 to 50 parts by weight of reinforcing fumed silica having a specific surface area of at least 50 m²/g as measured by the BET adsorption method,
(C) 0.01 to 5 parts by weight of carbon black having a specific surface area of 50 to 150 m²/g as measured by the BET adsorption method,
(D) platinum or a platinum compound in an amount to provide 1 to 1,000 ppm of platinum atoms based on the total weight of the organopolysiloxane gum as component (A),
(E) 0.01 to 5 parts by weight of a triazole or derivative thereof,
(F) 0.01 to 5 parts by weight of an organopolysiloxane containing an aromatic hydrocarbon group, but not an alkenyl group, represented by the general formula (2):

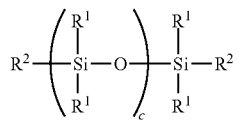

(2)

wherein $R^1$ is each independently a $C_1$-$C_8$ unsubstituted or substituted monovalent saturated hydrocarbon group, and phenyl accounts for at least 3 mol % of the total moles of $R^1$; $R^2$ is each independently a hydroxy group or a $C_1$-$C_8$ unsubstituted or substituted monovalent saturated hydrocarbon group; and c is an integer of at least 3, and
(G) a curing agent in an amount sufficient to cure the composition,
wherein the composition is free of an organosilicon compound having a nitrogen-containing organic group and an unsaturated hydrocarbon group, and cures to give a silicone rubber cured product having a Durometer A hardness of up to 50 and an elongation at break of at least 650% as measured according to JIS K 6249:2003.

2. The millable silicone rubber composition of claim 1 which cures into a silicone rubber cured product having a breakdown voltage (BDV) as measured according to JIS K 6249:2003, which is improved at least 10% over a cured product of a composition obtained by removing (C) carbon black from said composition.

3. The millable silicone rubber composition of claim 1 wherein component (B) is hydrophobic fumed silica.

4. The millable silicone rubber composition of claim 1, for use in the manufacture of power cable connectors.

5. A silicone rubber cured product obtained by curing the millable silicone rubber composition of claim 1.

6. The silicone rubber cured product of claim 5, having a tensile set of up to 15% under the test conditions that 100% constant elongation continues at 180° C. for 22 hours, a volume resistivity of at least 1 TΩ·m, and a breakdown voltage (BDV) of at least 20 kV/mm, as measured according to JIS K 6249:2003, and undergoing no conduction breakdown in the tracking resistance test under an applied voltage of 4.5 kV by Method 1 test according to the IEC Publ. 587 standard.

7. An electrically insulating member for use in power cable intermediate connections or terminal connections, comprising the silicone rubber cured product of claim 5.

8. The millable silicone rubber composition of claim 1 wherein component (C) is blended in an amount of 0.01 to 2 parts by weight per 100 parts by weight of component (A).

9. The millable silicone rubber composition of claim 1 wherein component (C) is blended in an amount of 0.01 to 0.5 parts by weight per 100 parts by weight of component (A).

10. The millable silicone rubber composition of claim 1 wherein component (E) consists of benzotriazole, 1-methylbenzotriazole, 5,6-dimethylbenzotriazole, 2-phenylbenzotriazole, 1-hydroxybenzotriazole, or methyl 1-benzotriazolecarboxylate.

11. The millable silicone rubber composition of claim 1 wherein component (G) is an organic peroxide.

12. The millable silicone rubber composition of claim 1 which cures to give an electrically insulating silicone rubber cured product.

13. The millable silicone rubber composition of claim 1 which is suitable for forming an electrically insulating member in power cable connections.

* * * * *